(12) United States Patent
Gaucherand et al.

(10) Patent No.: US 9,879,399 B2
(45) Date of Patent: Jan. 30, 2018

(54) ATTACHMENT SYSTEM ON A GEOTECHNICAL ANCHOR AND REINFORCING ASSEMBLY USING SUCH AN ATTACHMENT

(71) Applicant: SOLETANCHE FREYSSINET, Rueil Malmaison (FR)

(72) Inventors: Cyril Gaucherand, St German au Mont D'or (FR); Julien Lecigne, Givry (FR); Rémy Fayard, Montceau les Mines (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 14/917,480

(22) PCT Filed: Sep. 5, 2014

(86) PCT No.: PCT/FR2014/052195
§ 371 (c)(1),
(2) Date: Mar. 8, 2016

(87) PCT Pub. No.: WO2015/033072
PCT Pub. Date: Mar. 12, 2015

(65) Prior Publication Data
US 2016/0215471 A1 Jul. 28, 2016

(30) Foreign Application Priority Data
Sep. 9, 2013 (FR) ..................... 13 58612

(51) Int. Cl.
*E02D 29/02* (2006.01)
*F16G 15/06* (2006.01)
*E02D 5/80* (2006.01)

(52) U.S. Cl.
CPC ........... *E02D 29/0233* (2013.01); *E02D 5/80* (2013.01); *E02D 29/0225* (2013.01); *F16G 15/06* (2013.01)

(58) Field of Classification Search
CPC ..... F16G 15/06; E02D 29/02; E02D 29/0225; E02D 29/0233; E02D 29/0241
(Continued)

(56) References Cited

U.S. PATENT DOCUMENTS 233,281 A * 10/1880 Reinhold et al. ... F16B 13/0808
403/168
1,808,358 A * 6/1931 Leipert .................. B60G 11/12
267/270
(Continued)

FOREIGN PATENT DOCUMENTS

CH        701928 B1    4/2011
FR    2 921 943 A1    4/2000
(Continued)

OTHER PUBLICATIONS

SU 1224491 machine translation p. 1, May 13, 2017.*

*Primary Examiner* — Sunil Singh
(74) *Attorney, Agent, or Firm* — Dentons US LLP

(57) ABSTRACT

A reinforcing assembly for a building construction built in front of a foundation, the reinforcing assembly comprising a geotechnical anchor anchored into the foundation with a threaded end portion projecting out of the foundation, a draw nut attachment element screwed onto the end portion of the anchor, one or two clevises mounted on the end of the anchor behind the draw nut, the clevis comprising first and second eyes each having a hole traversed by the anchor, the two eyes being connected to each other by a body with a generally curved shape, a reinforcement passing through the recess delimited by the curved body of the clevis and the (Continued)

anchor, configured to be linked directly or indirectly to the facing of the construction erected in front of the existing foundation.

16 Claims, 5 Drawing Sheets

(58) Field of Classification Search
USPC ......... 294/82.1, 82.11; 59/86; 70/24, 30, 35, 70/36, 49; 405/262, 284–287, 405/302.4–302.7
See application file for complete search history.

(56) References Cited

U.S. PATENT DOCUMENTS

| | | | | |
|---|---|---|---|---|
| 7,448,823 B2* | 11/2008 | Silva | ........................ | F16G 15/06 403/325 |
| 7,540,140 B1* | 6/2009 | Diaz | ........................ | F16G 15/06 403/154 |

FOREIGN PATENT DOCUMENTS

| | | | |
|---|---|---|---|
| FR | 2 803 610 A1 | | 7/2001 |
| FR | 2825730 A1 | * | 12/2002 |
| FR | 2 860 811 A1 | | 4/2005 |
| FR | 2 878 268 A1 | | 5/2006 |
| FR | 2 913 035 A1 | | 8/2008 |
| JP | 10-30629 A | * | 2/1998 |
| JP | 2006-316462 A | * | 11/2006 |
| KR | 2009020073 A | * | 2/2009 |
| SU | 1224491 A | * | 4/1986 |
| WO | 2011/126267 A2 | | 10/2011 |

* cited by examiner

ATTACHMENT SYSTEM ON A GEOTECHNICAL ANCHOR AND REINFORCING ASSEMBLY USING SUCH AN ATTACHMENT

This application is a National Stage Application of International Application No. PCT/FR2014/052195 filed Sep. 5, 2014, which claims priority from French Patent Application No. 1358612, filed on Sep. 9, 2013, each of which are hereby incorporated by reference in their entirety.

The present invention relates to the building of civil engineering structures using reinforced fill techniques. More particularly, the invention relates to the systems for attachment to geotechnical nails or other anchoring elements and the associated reinforcement structures using such attachment systems.

The structures to which the invention relates may have various uses such as for example widening traffic ways, extending a constructible area, preventing deterioration, erosion or the fall of stones from rocky walls, or to create an aesthetic architectural foundation. They in general comprise fill placed against the foundation or the soil structure supporting the traffic way or the constructible area to be extended or the foundation the surface of which is deteriorating. The vertical wall of the structure in front of this fill is formed by a facing connected to the foundation, which may be pre-existing, by means of a reinforcing assembly dealt with below.

It should be noted that the foundation of the pre-existing type may have regular or irregular geometric characteristics. Likewise, it should be noted that the foundation in question may be a foundation erected by construction, not necessarily pre-existing, for which it is possible to use whenever possible through tie rods in place of conventional geotechnical nails.

In the prior art, using geotechnical nails as a means of anchoring in the pre-existing foundation or soil structure is conventional; in practice, the pre-existing foundation is drilled in order to insert therein a geotechnical nail (a long metal rod) and the nail is sealed by means of a sealing material injected into the drilling around the nail. Care is taken to allow one end of the nail to project outside; this end is normally threaded (but not necessarily).

Next, according to a first solution, a ring nut (a nut with an eye) provided with an internal thread is placed on the threaded projecting end; this ring nut is screwed onto the threaded end of the geotechnical nail. Then a standard clevis (of the lifting type) is passed through this closed ring, making it possible to make the connection with a reinforcement, that is to say a metal cable or a reinforced synthetic band, or any other type of reinforcement, this reinforcement being connected directly or indirectly to the facing of the structure that has just been erected. Fill material is also provided in order to fill the space delimited by the pre-existing foundation and the erected facing.

However, it turns out that the use of ring nuts (eye nuts) raises drawbacks. First of all, it is necessary to use ring nuts that are perfectly compatible with the threaded end of the nail, which in practice makes it necessary to buy the ring nut from the same manufacturer as the geotechnical nails since such a ring nut is not a standard part. Finally, it may prove difficult, once the clevises for connection with the reinforcements are in place, to visually check that the thread on the nail is completely engaged, that is to say that the end of the nail fits flush with or projects inside the ring or at least that a sufficient length of thread is engaged, or that the screw of the connection clevis is properly screwed in; however, it is desirable to carry out a quality check to ensure the safety of the constructed structure before filling in with filing material.

In addition, according to this first known solution, assembly takes a long time and, as the thread on the nail has a fine pitch, particles or grains of sand are frequently inserted in the nail thread and this may hinder the screwing of the nut.

According to a second known solution, a metal transverse bar is welded onto the end of the nail so as to form a T, and then the reinforcements are passed around the transverse bar before tensioning them. However, carrying out welding on site does not guarantee an always constant quality level, and in addition such a weld is subject to corrosion over time.

One aim of the present invention is to at least partly overcome the drawbacks mentioned above.

The invention thus proposes a reinforcing assembly for a building construction, erected in front of a foundation, the building construction comprising a facing erected in front of the foundation, the reinforcing assembly comprising:

at least one element forming an anchoring, anchored in the foundation with an end portion projecting outside the foundation, centred on an axis A, at least one attachment element assembled on the end portion of the element forming an anchor, at least one first clevis mounted on the end of the element forming an anchor behind the attachment element, the first clevis comprising first and second eyes each having an orifice centred on the axis A through which the element forming an anchor passes, the two eyes being connected together by a body with a generally curved shape, a reinforcement passing through the recess delimited by the curved body of the clevis and the element forming an anchor, configured so as to be connected directly or indirectly to the facing of the structure.

The element forming an anchor may typically, but not exclusively, be a geotechnical nail. The attachment element may typically, but not exclusively, be a nut, referred to as a draw nut, screwed onto a threaded end portion of the element forming an anchor.

By means of which only the attachment element has to be perfectly compatible with the end of the element forming an anchor whereas the clevis may have geometric characteristics that are to a certain extent independent of those of the element forming an anchor and the attachment element and may further have material characteristics different from that of the attachment element.

In the particular case of the threaded end and the draw nut, only the draw nut has to be perfectly compatible with the thread of the element forming an anchor, whereas the clevis may have geometric characteristics to a certain extent independent of those of the element forming an anchor and the draw nut. It is also possible in this case to choose a wider thread pitch, and the draw nut may be an entirely standard part.

In the preferred embodiments of the structure according to the invention, it is possible to have the following features taken alone or in combination:

the end of the element forming an anchor is threaded, and the attachment element is a draw nut; which is a simple and very usual solution for providing a means for holding the clevis;

the body of the clevis may have a roughly semicircular shape; so that the geometric configuration confers very good strength on the clevis and the latter can withstand very substantial forces, since the cantilever remains very limited;

the first clevis can pivot about the axis A, independently of the attachment element; so that, when the reinforcement is tensioned, the clevis is positioned all alone in the direction of the tensile force, which is not always the case when a ring nut is used;

the first clevis is symmetrical with respect to a midplane P perpendicular to the axis A; so that the clevis can be mounted indifferently on the element forming an anchor in both possible positions, and therefore without any risk of error;

the reinforcing assembly may further comprise a stop nut placed on the nut behind the clevis; it is thus possible to prevent the clevis moving back before tensioning;

the reinforcing assembly may comprise at least a second clevis with a structure similar or identical to the first clevis, with first and second eyes each having an orifice centred on the axis A, one of these eyes being arranged substantially without any axial clearance between the first and second eyes of the first clevis; by means of which the tensile forces exerted on the reinforcements are absorbed by the axial stacking of the four eyes that bear on the draw nut; the presence of the second clevis thus reinforces the absorption of forces accepted on the first clevis, or at the very least limits its deformation;

the first clevis and the second clevis may be offset angularly about the axis A; so that it is easily possible to distribute a plurality of reinforcements around the element forming an anchor;

the attachment element may be a nut with a spherical span (spherical bearing); which makes it possible to adapt to a misalignment of the clevis and to preserve a sufficiently extensive contact surface while distributing the forces;

the draw nut may be in a different colour from the element forming an anchor; which facilitates the visual check on the correct position of the draw nut;

the element forming an anchor may be a geotechnical nail sealed in the foundation; which is a solution very much used in the case of pre-existing thick foundations.

The invention also relates to a clevis suitable for being used in a reinforcing assembly for a building structure, the clevis comprising a first eye and a second eye each having an orifice centred on an axis A, the two eyes being connected together by a body with a roughly semicircular shape, the first and second eyes each having an axial thickness E2 and being separated axially by a distance E1 (that is to say a gap) lying between E2 and 1.10 E2, so that, between the first and second eyes, an eye of another similar clevis may come to be interposed, with a minimal or zero clearance.

By means of which it is also possible to interpose the eye of such another clevis between the two eyes of another such clevis, and this without any substantial clearance, so as to have two interleaved clevises.

According to optional features, it is also possible to have for the clevis:

the semicircular body has a cross section of diameter D3 that satisfies the relationship 0.75 E2<D3<E2; so that an optimum is obtained between the size of the recess delimited by the curved body 53 of the clevis and the nail and the mechanical strength of the clevis;

each of the eyes may have a radial outside diameter D2 with the ratio D2/D1 between 1.5 and 2.5; by means of which the absorption of the tensile and bending forces is indeed distributed in the zone of the eye, the latter having satisfactory strength;

the clevis may be symmetrical with respect to a midplane P perpendicular to the axis A, and the orifice of each eye may have a frustoconical section splaying in a direction directed opposite to the plane P; thus, even if the clevis becomes misaligned on the end of the nail having a smaller diameter, the bearing surface remains fairly wide and the forces non-concentrated;

each of the eyes has a rim with a conical axial section (in the form of a bevel) between the frustoconical section and the lateral face directed towards the attachment element; so that, in the case of the use of draw nut with a spherical span and a nail having a small diameter, the bearing on the draw nut is distributed at least over a circle and the force is not concentrated.

Another aspect of the invention relates to a method for building a structure in front of a foundation, in which a reinforcing assembly as described previously is assembled, the method comprising the following steps:

inserting an element forming an anchor in the foundation, optionally placing a stop nut on the projecting part of the element forming an anchor, passing at least one reinforcement through the recess of a clevis as described above and next fitting the two eyes of said clevis, with the reinforcement thus arranged, on the end of the element forming an anchor, screwing an attachment element on the end of the element forming an anchor.

Preferably, the attachment element may very typically, but not exclusively, be a nut, referred to as a draw nut, screwed onto a threaded portion of the end of the element forming an anchor.

In this way a particularly simple and reliable method is obtained, which makes it possible to avoid any problem of non-quality in assembling the reinforcing assembly.

Other particularities and advantages of the present invention will emerge from the following description of non-limitative example embodiments, with reference to the accompanying drawings, in which:

For reasons of clarity, the dimensions of the various elements depicted in these figures are not in proportion to their actual dimensions. Moreover, in all the figures, identical references correspond to identical elements.

FIGS. 1 to 7 illustrate a first example of a non-limitative application of the invention to the building of a reinforcing structure.

Figure 1:
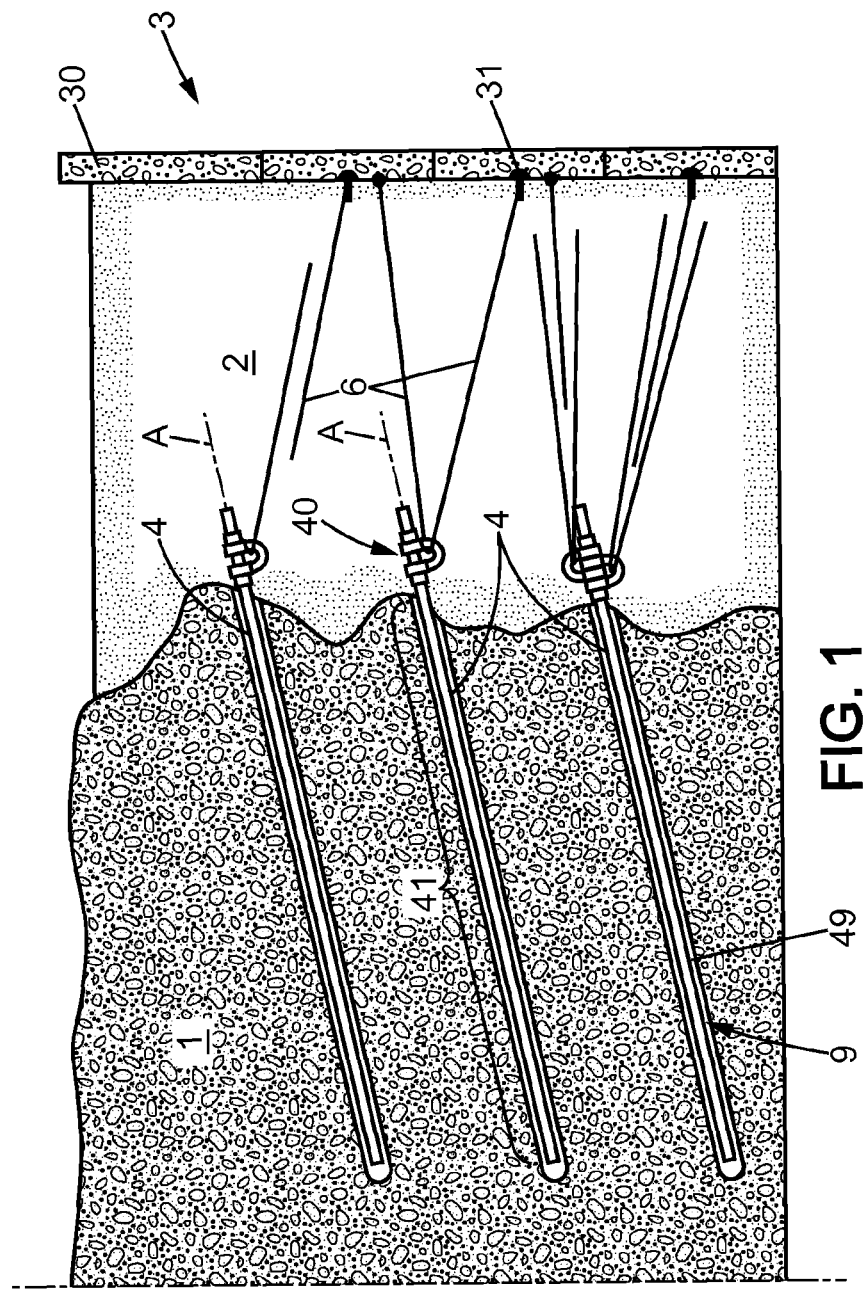
FIG. 1 is a schematic view in lateral section of an example of a structure using a reinforcing assembly according to the invention.

The pre-existing foundation 1 has a wall with a more or less regular profile on its front side; this pre-existing foundation is intended to serve as a support structure for the structure and in particular for the reinforcing assembly that will be described hereinafter, by means of the installation of geotechnical nails, known per se.

Such a geotechnical nail 4 is in the form of an elongate round rod, fabricated from strong metal such as a steel or an alloy with a high elastic limit. The major part 41 of this nail is inserted in a hole 9 that has previously been drilled in the foundation 1, but one end 40 is left projecting outside the foundation. After the nail is positioned in its required position, a sealing material 49 is injected into the hole around the nail over a certain length. When the sealing material 49 has hardened, the nail forms a very strong anchoring in the foundation, in particular in the longitudinal direction, that is to say along the axis A along which the nail extends.

The end 40 is threaded in the example illustrated, preferably according to a standard pitch. However, a fixing system other than a screw and nut relationship can be provided, as will be indicated later.

The front face of the erected structure comprising a facing 3, for example composed of juxtaposed prefabricated elements 30 made from reinforced concrete; usually these are rectangular sheets superimposed on the edge.

Reinforcements 6 are disposed for holding the facing 3 with respect to the foundation 1.

In the example depicted, the reinforcements 6 are linear elements such as laminated-steel reinforcements, or elements in two dimensions such as ladders or trellises, or geotextile strips. Numerous solutions are known to persons skilled in the art and some are found for example in the documents FR 2921943, FR 2913035 or FR 2860811, these references not being limitative.

In the example illustrated, a compacted fill 2 fills in the gap between the facing 3 and the wall formed by the front side of the foundation 1. Leaving the reinforcements in the open air is however not excluded, when they are direct tie rods simply covering the top of the structure with a roof for protecting them from the weather.

Figure 2:
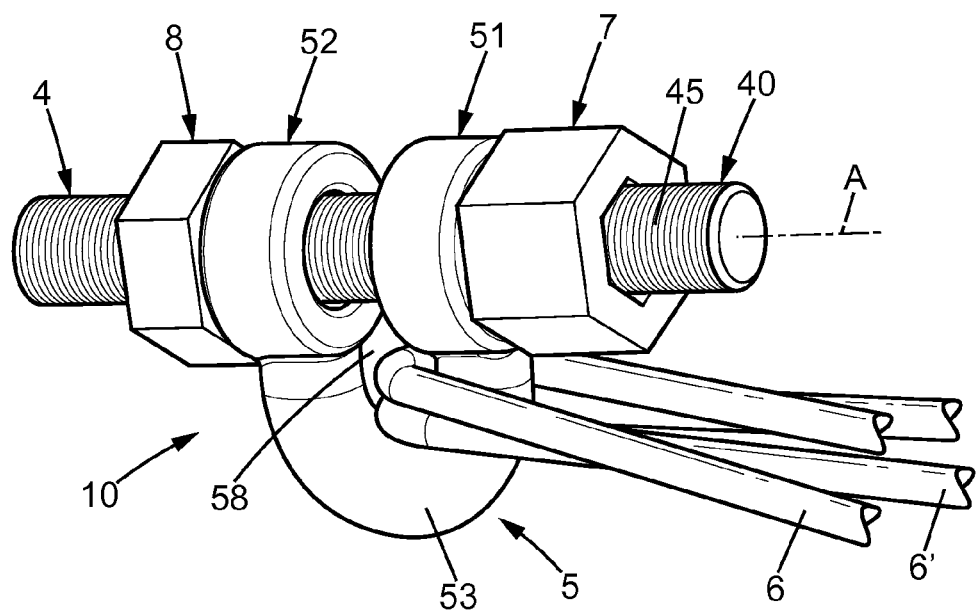
FIG. 2 is a perspective view of the attachment system used in the reinforcing assembly of the structure in FIG. 1.
Figure 3:
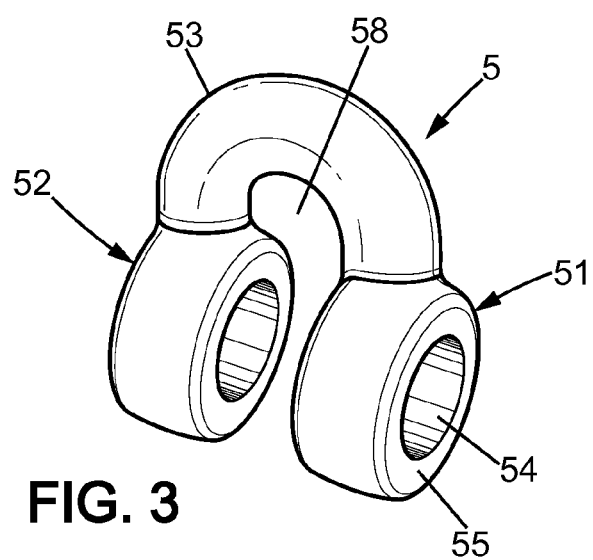
FIG. 3 is a perspective view of the clevis used in the attachment system for the structure in FIG. 1.

With reference to FIGS. 1 and 2, reinforcements 6 are buried in the fill 2, the fill making it possible to transmit the forces between the foundation and the facing, in particular when friction geotextile strips are used, placed close to one another, in which case the compacted fill that participates in the transmission of the forces holding the structure, by interaction between the strips of reinforcements and the fill itself.

The points 31 of attachment to the facing may take several forms, hollow shapes in the plate 30, projecting loops cast at prefabrication, or any other suitable attachment means; non-limitative examples are presented in the documents FR 2878268 and FR 2803610.

The connection between a reinforcement 6 and the geotechnical nail 4 is achieved advantageously by means of an attachment system 10 that will be described below.

In the vicinity of the end of the nail, a clevis 5 is disposed, with an overall form fairly close to the form of highly usual lifting clevises (otherwise called "shackles"). This is because the clevis comprises a first eye 51 and a second eye 52 disposed coaxially at a distance from each other. Each eye comprises an orifice 54 centred on the axis A through which the nail passes.

The two eyes 51, 52 are connected together by a body 53 with a roughly curved shape. Advantageously, this body has a semicircular shape. The main section of this body is round and has a diameter denoted D3.

A draw nut 7 is screwed onto the nut in front of the clevis. The internal thread of the draw nut corresponds to the external thread 45 of the end of the geotechnical nail; this is because it is this threaded interface that will absorb the tensile forces on the clevis, via the rear surface 75 of the nut, which receives the thrust of the clevis (here its front face 55 that bears flat on the nut).

Instead of a draw nut, it would be possible to use more generally any suitable attachment element such as a pin or key passing through a diametral hole provided in the end of the rod, or a pin or circlip inserted in one or more grooves arranged on the lateral zones of the rod, these configurations not being depicted in the figures but being entirely capable of being implemented in the context of the present invention.

The reinforcement (or reinforcements if there is more than one) is inserted in the internal recess 58 of the body delimited by the curved body 53 and the nail 4.

The clevis 5 pivots about the axis A when the reinforcement 6 is tensioned, so as to come into line with the traction line of the reinforcement 6; this effect can be referred to as the "swivelling" effect. Even if the traction line moves only a little away from the axis A, there is no restriction on the coming into line.

In this way a particularly simple attachment 10 is obtained; the clevis may be provided independently of the nail and draw nut; said clevis may be a standard element that can be used in a plurality of different configurations of attachment systems as described above.

The thread pitch of the nail and of the draw nut may be relatively large, which avoids certain problems of contamination by materials such as sand.

It should be noted that, optionally, a stop nut 8 may be arranged behind the clevis; this stop nut will have to have been positioned before the clevis is inserted, and this stop nut defines a maximum rear position for the clevis, in particular before the reinforcement 6 is tensioned. This stop nut does not withstand any significant force and may be thinner than the draw nut; it may optionally be replaced by an alternative solution based on a clip (clamp) attached to the thread.

The inside diameter D1 of the orifices 54 of the eyes must be greater than the outside diameter D0 of the end portion 40 of the nail 4. The clearance between the nail and the eyes of the clevis (D1-D0) may be more or less great; this will be illustrated later.

Figure 6:
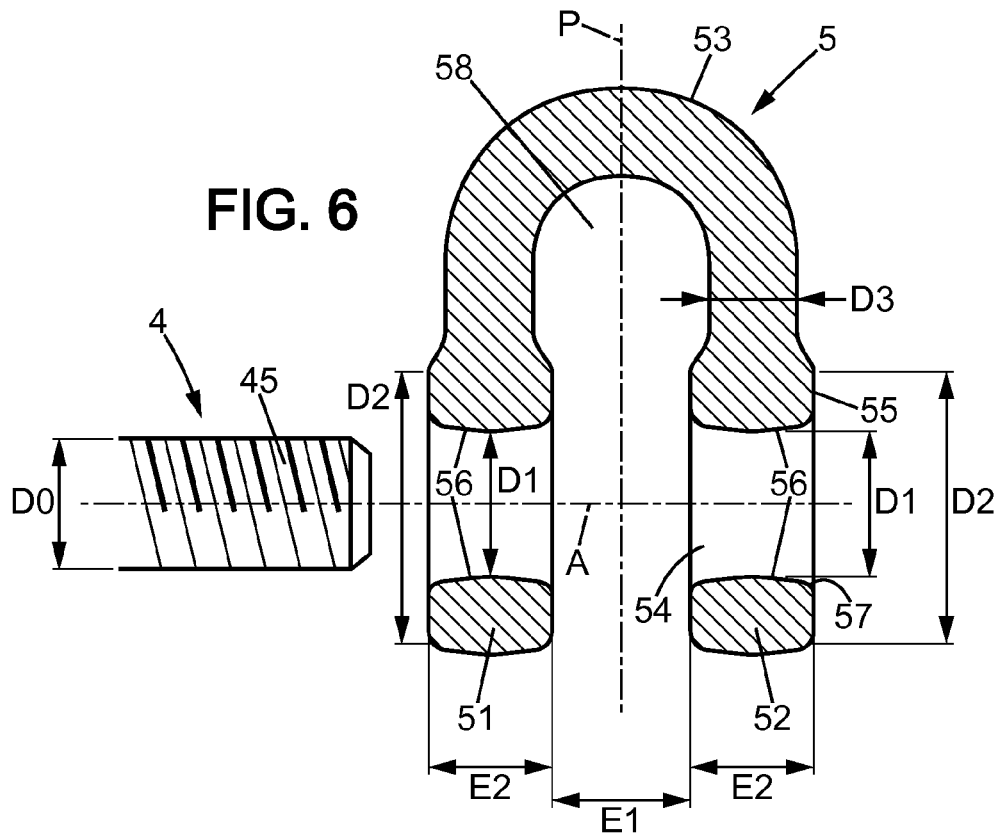
FIG. 6 is a detailed view in cross section of the clevis.

With reference to FIGS. 2 and 6, the clevis has advantageous geometric features. First of all, the clevis may advantageously be symmetrical with respect to a midplane denoted P perpendicular to the axis A and situated at equal distances from the eyes 51, 52.

In addition, although the orifices may be cylindrical bores, each orifice 54 of the first and second eyes may not be strictly cylindrical; this is because a frustoconical section 56 is provided, splaying towards the outside of the clevis in a direction directed opposite to the midplane P. Thus, when the clevis is put under traction by reinforcements, if there is any clearance between the orifice 54 and the nail, then the clevis becomes misaligned, that is to say in other words goes slightly aslant, while the frustoconical portion bears on the thread, which better distributes the forces than in the case of a cylindrical shape where only the rim would bear on the threads.

In addition, the external rim 57 of the orifice 54 may be a conical rim, forming a bevel, the usefulness of which will be seen later.

Furthermore, the first and second eyes 51, 52 each have an axial thickness E2, which represents their maximum direct dimension in the direction of the axis A. The first and second eyes 51, 52 are separated axially by a distance E1, referred to as the internal gap. This distance E1 is advantageously between E2 and 1.10 E2 (110% of E2), or even advantageously between E2 and 1.05 E2 (105% of E2), for a reason that will be explained later. However, for the case of a simple use depicted in FIG. 2, this condition is not strictly necessary and the distance E1 could be different. Likewise it would be possible to have different axial thicknesses of the two eyes.

The aforementioned section of diameter D3 of the semi-circular body 53 is slightly less in the example illustrated than the axial thickness E2 of the eyes. An optimisation of the form of the clevis in order to obtain a fairly large recess 58 while preserving very good strength is such that D3 satisfies the relationship 0.75 E2<D3<E2.

Each of the eyes has a radial outside diameter denoted D2 and the ratio D2/D1 is advantageously between 1.5 and 2.5 in order to optimise the strength of the clevis and its resistance to the tensile bending forces with cantilever.

The material of the clevis is a steel with a low silicon and phosphorus content so as to facilitate the application of a galvanisation process.

This is because provision is made for the clevis to be protected from corrosion throughout its service life and whatever the nature of the more or less aggressive soils and liquids that may be situated in the environment of the attachment system and of the clevis.

Figure 4:
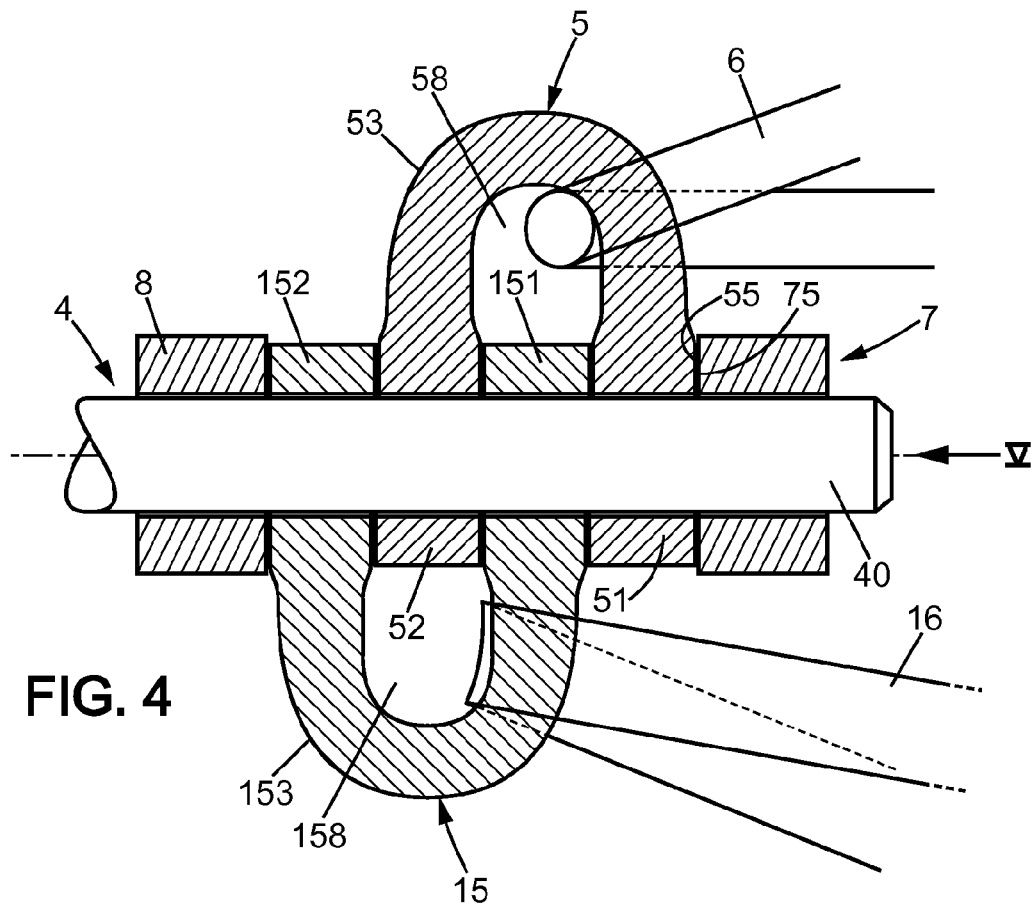
FIG. 4 is a view in cross section of the attachment system according to a configuration with two interleaved clevises.
Figure 5:
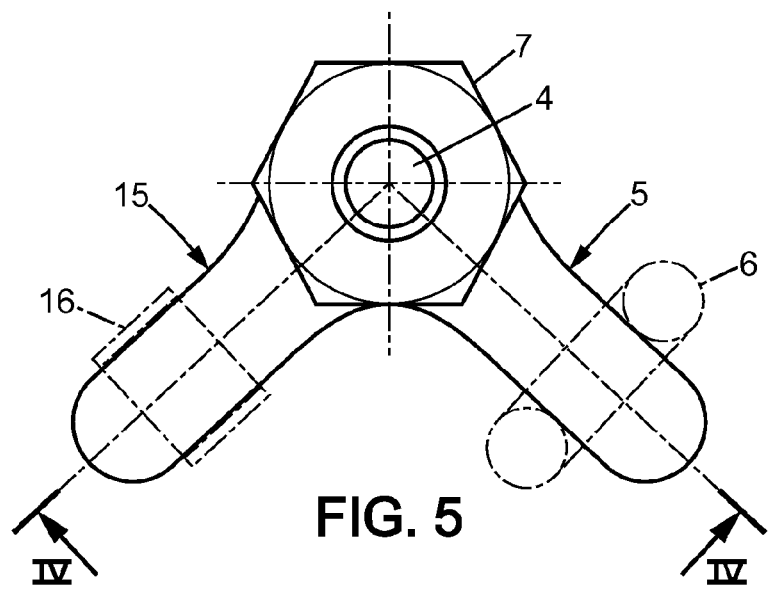
FIG. 5 is an end view of the configuration illustrated in FIG. 4.

FIGS. 4 and 5 show an assembly with two interleaved clevises, which makes it possible to increase the number of reinforcements attached to the geotechnical nail 4.

This is because there is not only a first clevis 5 as described previously, but also a second clevis 15 similar or identical to the first. This second clevis comprises a first eye 151 and a second eye 152. The first eye 151 is interposed (or inserted) between the two eyes 51, 52 of the first clevis. The optional stop nut 8 is situated in this configuration behind the second eye 152 of the second clevis.

According to this arrangement, with the supplementary condition E2 substantially equal to E1 (E1 between 100% and 105% or even 110% of E2), the four eyes of the first and second clevises are adjacent to one another and form together an axial stack in abutment on the draw nut 7 when the reinforcements are under tension, each of the four eyes bearing against the following one (a stacking in series).

Figure 7:
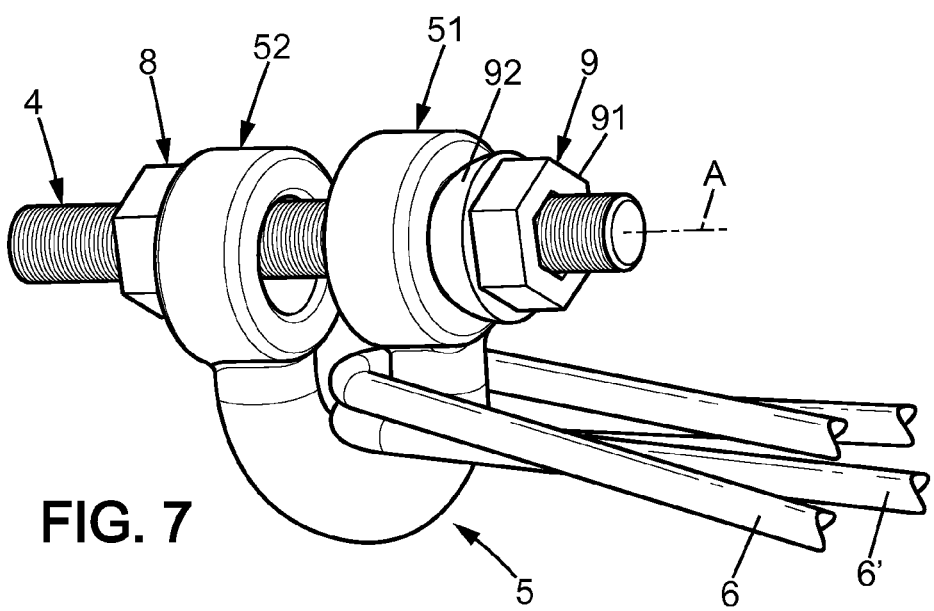
FIG. 7 is a view similar to FIG. 2 with a nail with a smaller diameter and a draw nut with a spherical span.

As presented in FIG. 4, a metal reinforcement wire 6 passes through the recess 58 of the first clevis; it could be between the second wire 6' in the same recess (cf. FIGS. 2 and 7).

A reinforcement in the form of a geotextile band 16 passes through the internal recess 158 formed by the curved body 153 of the second clevis 15. It would be possible to have several geotextile bands arranged one above the other and passing through the recess 158 of the clevis.

An annular offset about the axis A between the two clevises can be noted in FIG. 5, which makes it possible to attach several reinforcements to a single nail 4 without the reinforcements interfering with each other. The angular offset may be greater or lesser depending on the position of the reinforcements in the fill 2.

It should be noted that it would be possible to have more than two interleaved clevises, for example three or four, provided that E1 is respectively equal to substantially three or four times E2.

FIG. 7 illustrates the example where the diameter of the nail is substantially less than the diameter of the orifices 54 of the eyes of the clevis.

A nut with a spherical span is used, which has, in addition to the conventional threaded hexagonal portion 91, a spherical portion 92 centred on the axis.

In this case, as soon as a traction is exerted by the reinforcement 6, 6', the clevis 5 not only pivots about the axis but goes aslant because of the clearance D1-D0. However, the conical rim 57 comes to bear on the spherical portion 92 without creating a force concentration point and suitably distributing the stresses on the periphery of the draw nut.

Consequently, a single clevis specification may be suitable for a multiplicity of different applications with geotechnical nails of different provenances for a varied range of nail diameters.

Advantageously, it is possible to use this type of clevis alone or in an interleaved pair as described above. Such standardisation makes it possible to achieve a highly cost-effective solution.

Figure 8:
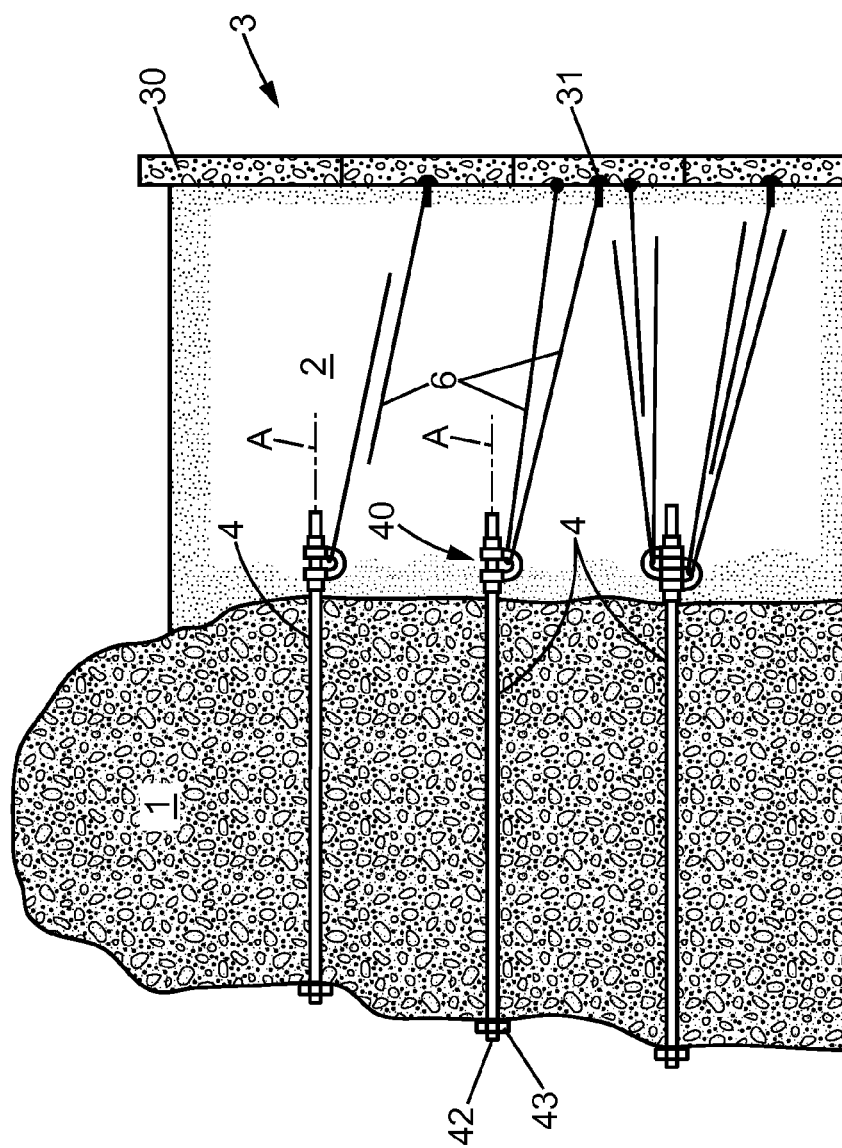
FIG. 8 shows a variant of FIG. 1, illustrating an embodiment with tie rods passing through the foundation.

FIG. 8 illustrates another embodiment in which the elements forming an anchor are not embedded geotechnical nails but tie rods anchored at their end 42 opposite to the end 40 where the clevis is arranged.

The tie rods in question are cylindrical metal rods that are placed in holes 9, drilled on either side of the foundation 1. At the opposite end 42, it is possible to place an anchoring nut 43 or weld a transverse element 43, or any other element for anchoring the opposite end 42 with respect to the foundation a figure.

The front end 40 of the tie rod 4 is analogous or similar to what was described for the embodiment in FIGS. 1 to 7, as well as the attachment system with the clevises as previously described.

It should be noted that the foundation 1 depicted may be a pre-existing foundation or a constructed foundation, erected previously or at the same time as the facing 3.

The invention claimed is:

1. A reinforcing assembly for a building construction, erected in front of a foundation, the building construction comprising a facing erected in front of the foundation, the reinforcing assembly comprising:
   at least one element forming an anchor, anchored in the foundation with an end portion projecting outside the foundation, centered on an axis A,
   at least one attachment element assembled directly on the end portion of the element forming the anchor,
   at least one first clevis mounted on the end portion of the element forming the anchor behind the attachment element, the first clevis comprising first and second eyes each having an orifice centered on the axis A through which the element forming the anchor passes, the two eyes being connected together by a body with a generally curved shape,
   a reinforcement passing through a recess delimited by the curved body of the clevis and the element forming the anchor, configured so as to be connected directly or indirectly to the facing of the building construction.

2. The reinforcing assembly according to claim 1, in which the end of the element forming the anchor is threaded, and in which the attachment element is a draw nut, able to be screwed onto a threaded end portion of the element forming the anchor.

3. The reinforcing assembly according to claim 1, in which the body has a roughly semi-circular shape.

4. The reinforcing assembly according to claim 1, in which the first clevis can pivot about the axis A, independently of the attachment element.

5. The reinforcing assembly according to claim 1, in which the first clevis is symmetrical with respect to a midplane P perpendicular to the axis A.

6. The reinforcing assembly according to claim 1, further comprising a stop nut placed on the element forming the anchor at a rear of the clevis.

7. The reinforcing assembly according to claim 1, further comprising at least a second clevis with a structure identical to the first clevis, with first and second eyes each having an orifice centered on the axis A, one of first and second eyes being arranged substantially without any axial clearance between the first and second eyes of the first clevis.

8. The reinforcing assembly according to claim 7, in which the first clevis and the second clevis are offset angularly about the axis A.

9. The reinforcing assembly according to claim 1, in which the attachment element is a nut with a spherical span.

10. The reinforcing assembly according to claim 1, in which the element forming the anchor is a geotechnical nail anchored in the foundation.

11. A clevis suitable for being used in a reinforcing assembly for a building structure, the clevis comprising:
a first eye and a second eye each having an orifice centered on an axis A, the two eyes being connected together by a body with a roughly semicircular shape, the first and second eyes each having an axial thickness E2 and being separated axially by a distance E1 lying between E2 and 1.10 E2, so that, between the first and second eyes, an eye of another similar clevis may come to be interposed, with a minimal or zero clearance, the clevis being symmetrical with respect to a midplane P perpendicular to the axis A, and in which the orifice of each eye has a frustoconical section splaying in a direction directed opposite to the plane P.

12. The clevis according to claim 11, in which the semi-circular body has a cross section of diameter D3 that satisfies the relationship 0.75 E2<D3<E2, D1 being a radial inside diameter of the eyes.

13. The clevis according to claim 11, in which each of the eyes has a radial outside diameter D2 and the ratio D2/D1 is between 1.5 and 2.5.

14. The clevis according to claim 11, each of the eyes has a rim with a conical axial section between a frustoconical section and a lateral face directed towards an attachment element.

15. A method for building a structure in front of a foundation, in which a reinforcing assembly, as described in claim 1, is assembled, the method comprising the following steps:
inserting the element forming the anchor in the foundation, leaving the end portion projecting,
optionally placing the stop nut on the projecting part of the element forming the anchor,
passing at least one reinforcement through the recess of the clevis comprising first and second eyes connected together by the body with a roughly curved shape, and next fitting the two eyes of said clevis, with the reinforcement thus arranged, on the end of the element forming the anchor,
assembling the attachment element on the end of the element forming the anchor.

16. The method according to claim 15, in which the end of the element forming the anchor is threaded, and in which the attachment element is a draw nut, screwed on a threaded end portion.

* * * * *